Aug. 20, 1968          J. C. ANDERSON          3,397,850
FILAMENT WINDING APPARATUS
Filed Oct. 31, 1966                        3 Sheets-Sheet 1

INVENTOR.
JOHN C. ANDERSON
BY C. Harvey Hold
HIS ATTORNEY

INVENTOR.
JOHN C. ANDERSON
BY
C. Harry Hobl
HIS ATTORNEY

Aug. 20, 1968    J. C. ANDERSON    3,397,850

FILAMENT WINDING APPARATUS

Filed Oct. 31, 1966    3 Sheets-Sheet 3

INVENTOR.
JOHN C. ANDERSON
BY
C. Harvey Gold
HIS ATTORNEY

United States Patent Office 3,397,850
Patented Aug. 20, 1968

3,397,850
FILAMENT WINDING APPARATUS
John C. Anderson, Salt Lake City, Utah, assignor to Engineering Technology, Inc., Salt Lake City, Utah, a corporation of Utah
Filed Oct. 31, 1966, Ser. No. 590,853
14 Claims. (Cl. 242—158)

ABSTRACT OF THE DISCLOSURE

A filament winding apparatus which includes a spindle with appropriate drive means for rotating a mandrel, a carriage for positioning filament on the rotating mandrel, and means for driving the carriage at speed which is the sum of a speed in direct proportion to the speed of the spindle and an additional incremental speed to position the filament on the mandrel in a side by side arrangement. A variable speed device can be used to impart the additional incremental speed to the carriage.

---

This invention relates to a filament winding apparatus, and in particular, to a winding apparatus for circumferentially and helically winding filament on mandrels of various types.

In recent years filament winding has become a very popular method for imparting strength to vessels and tubes or for forming vessels and tubes which must be light weight and yet which must have sufficient strength to retain fluids which are maintained under high pressure conditions. Generally such tubing and vessels are formed by winding a filament about a form referred to as a mandrel constructed from a light weight plastic or resinous material which if not wound with a filament would not have sufficient strength to retain pressurized fluids. However, when a conventional winding filament such as fiber glass is properly wound upon a mandrel, said mandrel is capable of maintaining high pressure fluid which previously could be maintained only in heavy metal structures such as those constructed from steel. Two types of filament winding are generally used to produce vessels and tubing and to obtain the desired increase in strength in objects of the type described, to-wit: circumferential winding and helical winding. In circumferential winding, filament is wrapped around the circumference of a mandrel in a plane substantially perpendicular with the center axis of said mandrel. However, so that the filament does not fall directly on top of a previously wound filament, it is slowly moved in a direction parallel with the center axis of the mandrel wherein it is wound in a position which is adjacent to said previously wound filament. By increasing the speed of the filament movement in a direction parallel to said mandrel's axis, spacing between the filament wrappings is varied. In a helical winding operation the filament is wound about the mandrel in a plane which forms an angle, substantially less than 90 degrees, with the center axis of said mandrel, i.e, the filament spirals about the mandrel. As in the case of circumferential winding, helically wound filaments are laid side by side with a predetermined spacing therebetween. Heretofore filament winding machines have been devised to accomplish windings of the type described. However, such machines generally have been designed to wind filaments with a predetermined spacing and if such spacing is to be changed, it is necessary to change gears, reposition pulleys, etc., while the winding machine is shut down. In addition, such machines often require the use of a plurality of power supplies to turn the spindle which rotates the mandrel being wound and to move the carriage which positions the filament on said mandrel. As a result, winding devices of the type heretofore used are expensive down periods while filament spacing is being adjusted.

It it accordingly an object of my invention to provide a device for winding filament which overcomes the objecin their construction and, in addition, require long shut tions and disadvantages heretofore found in such devices.

Another object of my invention is to provide a filament winding apparatus which uses a single power source to operate its spindle and its carriage.

Still another object of my invention is to provide carriage movement adjustment means in a filament winding apparatus which enables the movement of said carriage to be adjusted while said machine is in operation.

Still another object of my invention is to provide a filament winding machine which performs circumferential winding operations and helical winding operations.

Still another object of my invention is to provide a filament winding machine which is easy to operate, simple in design, and inexpensive to construct.

Still further objects of my invention will become apparent to those skilled in the art as the invention is better understood by reference to the detailed description appearing hereinafter.

The foregoing objects of my invention and attendant advantages may be achieved by providing an apparatus for helically and circumferentially winding filament on a mandrel which apparatus comprises a spindle which is used to rotate said mandrel, drive means for rotating said spindle at a predetermined rate, and filament carriage means for positioning said filament on said mandrel. In a helical winding operation the carriage is driven at a speed which is the sum of a speed which is in direct proportion to the speed of said spindle and an additional increment which is added to said carriage to enable the filament to be wound in a side by side fashion. The summing of said speeds is accomplished by using compound drive planetary gearing means the single output of which is used to drive the carriage. In a circumferential winding operation, the carriage is no longer driven at a rate which is in direct proportion to the speed of the spindle but is moved only said small increment during each revolution of said spindle. In the preferred embodiment of my invention, the additional incremental speed is imparted to the carriage through the use of variable speed means such as a conventional ball disc integrator.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

Figure 1:
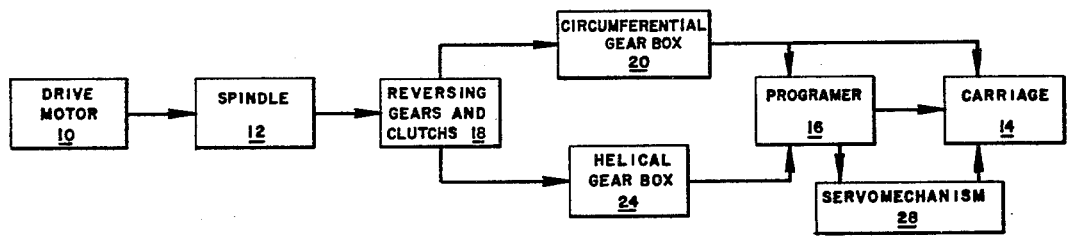
FIGURE 1 is a block diagram showing the relationship between the drive motor, spindle, gear boxes, programmer and carriage.

Referring now more particularly to the drawings, FIG-

URE 1 shows a basic block diagram which illustrates the coaction between the various components used in my apparatus. As shown, drive motor 10 rotates spindle 12 to which a mandrel is attached, which mandrel is to be wound with a conventional filament. Said filament is fed to the mandrel from carriage 14 which is programmed with programmer 16 to reciprocate across said mandrel at a rate which is dependent upon the type of winding which is to be used. For example, in a circumferential winding operation, carriage 14 only moves a short distance during each complete revolution of spindle 10 so that the filaments wound on the mandrel lie in a substantially side by side fashion. For this type of winding, a helical winding clutch is disengaged and a circumferential winding clutch is engaged. Spindle 12 drives circumferential gear box 20 which in turn produces an output that is used to drive said programmer 16 which drives carriage 14. When carriage 14 reaches one of the ends of the mandrel during a circumferential winding operation its direction is reversed through the use of reversing gears and clutches 18 thereby allowing additional layers of filament to be wrapped over said mandrel. In a helical winding operation, spindle 12 drives helical gear box 24 to produce an output which is the sum of a speed in direct proportion to the speed of spindle 12 and an additional incremental speed such as the speed used in circumferential winding. The output of helical gear box 24 drives programmer 16 which in turn drives carriage 14. Programmer 16 may be used to drive carriage 14 directly in both helical and circumferential winding operations or it may be used to provide an electrical impulse to servomechanism 28 which in turn powers carriage 14.

Figure 2:
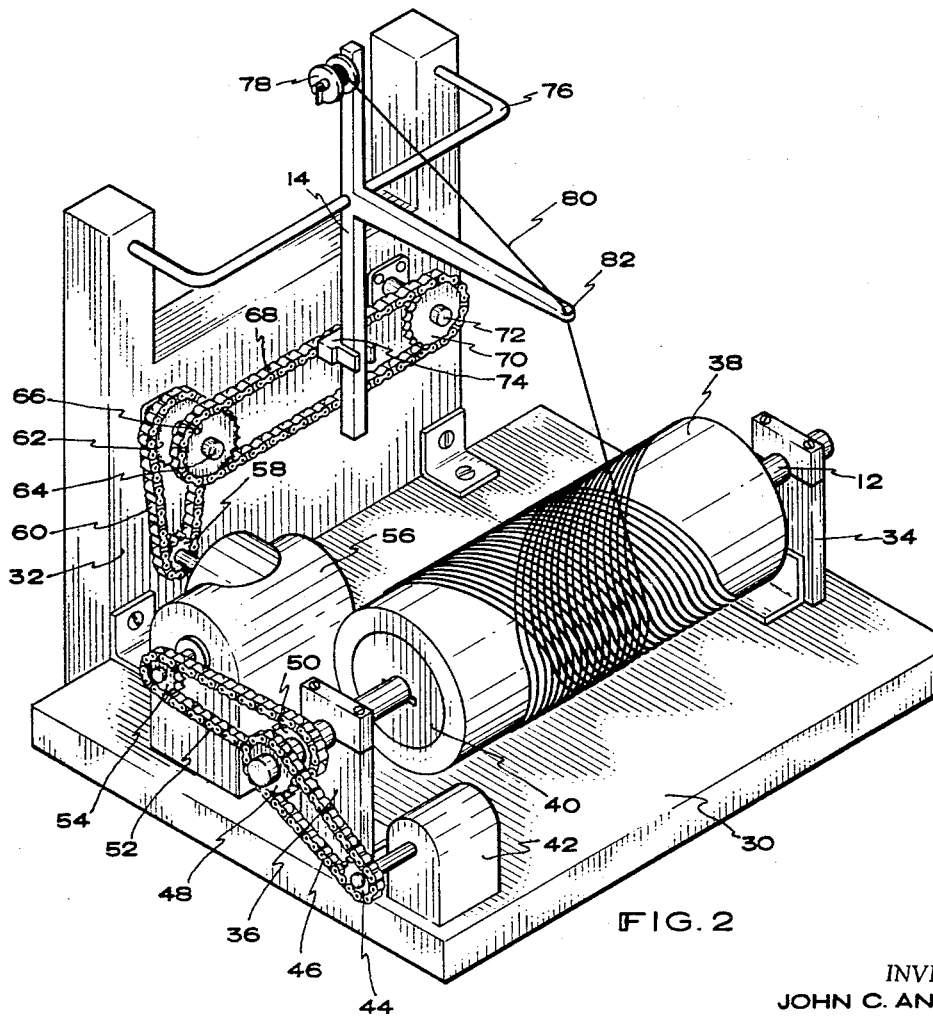
FIGURE 2 is a perspective view of a simplified filament winding device constructed according to my invention.

A simplified perspective view of my filament winding apparatus is shown in FIGURE 2. Base plate 30, with attached vertically extending end plate 32, is positioned to support the component parts used in the winding device. Spindle 12 is journaled at its opposite ends to brackets 34 and 36 so that it is freely rotatable. Mandrel 38 is secured to said spindle 12, through the use of connectors 40, so that said mandrel 38 rotates about its center axis when spindle 12 is rotated. Motor 42 drives spindle 12 by rotating sprocket 44 which sprocket engages chain 46. Said chain 46 coacts with sprocket 48, attached to spindle 12, and accordingly, when said sprocket 48 is rotated said rotation is imparted to spindle 12. Sprocket 50 is also securely connected to spindle 12 and is positioned to coact with chain 52 which in turn drives gear box sprocket 54. Said gear box sprocket 54 drives circumferential gear box 20 and helical gear box 24 which are contained within gear housing 56 in a fashion hereinafter described. The output from gear housing 56 is imparted to sprocket 58 which sprocket drives chain 60. Said chain 60 coacts with carriage drive sprocket 62 which is securely attached to carriage drive shaft 64. Said carriage drive shaft 64 is journaled at one end to end plate 32 and is provided with carriage drive chain sprocket 66 at its other end. Said carriage drive chain sprocket 66 is positioned to drive carriage drive chain 68 which is mounted around said sprocket 66 and sprocket 70. Said sprocket 70 is rotatably mounted on positioning shaft 72 which shaft is in turn secured to end plate 32 at a position so that a plane passed through shaft 64 and said shaft 72 is substantially parallel with the center axis of spindle 12. Slide adapter 74 is rotatably mounted to drive chain 68 in a fashion which enables it to follow said chain 68 about its entire course of travel without rotating, i.e., the direction of slide adapter 74 remains substantially unchanged. Carriage 14, hereinafter described in detail, is positioned to coact with slide adaptor 74 and to be moved therewith. In addition, carriage 14 is slidably mounted on slide bar 76, which bar is attached at its opposite ends to end plate 32, thereby enabling carriage 14 to move along a predetermined plane as slide adaptor 74, attached to chain 68, moves around sprockets 66 and 70. By providing a device of the type described chain 68 acts as programmer 16. Filament 80, wound on spool 78, is passed through aligning tip 82 of carriage 14 and is laid upon mandrel 38 as said mandrel is rotated.

Figure 3:
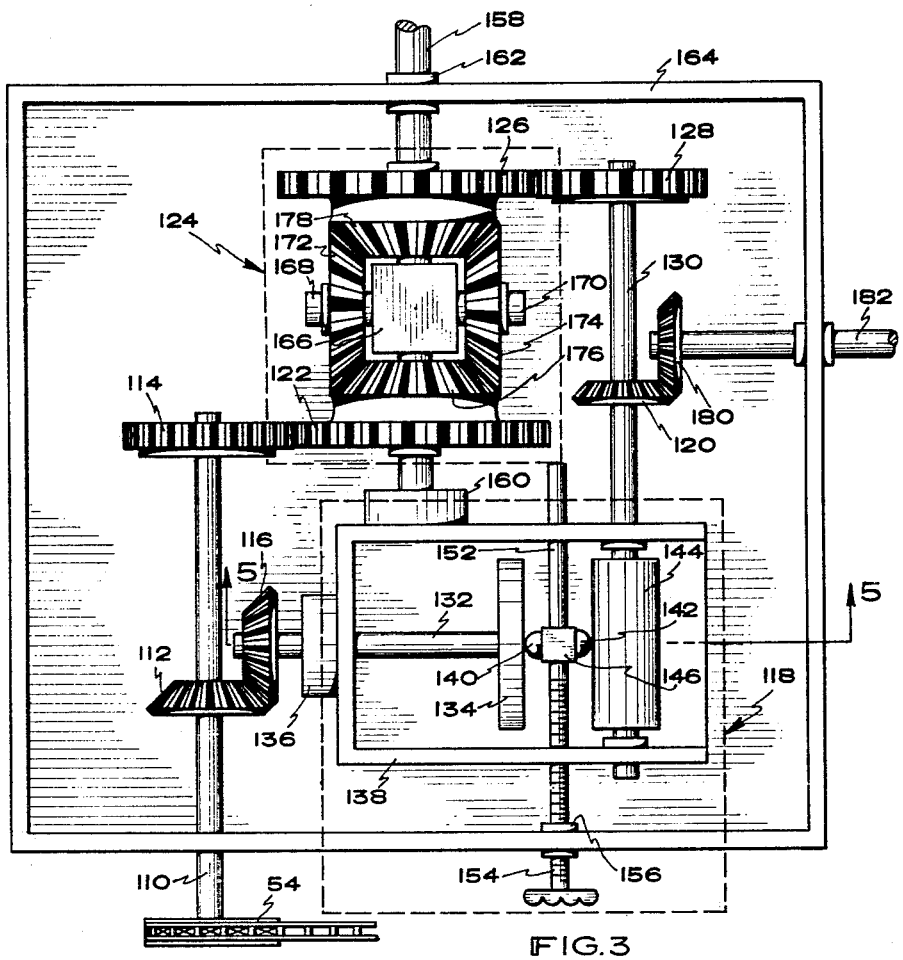
FIGURE 3 is a top view of the gear box which is used in my apparatus during helical and circumferential winding operations.

The basic helical and circumferential drive means used in my apparatus is shown in detail in FIGURE 3. Sprocket 54, driven in the fashion heretofore described, rotates power input shaft 110 which in turn drives beveled gear 112 and differential drive gear 114. Said beveled gear 112 drives beveled gear 116 which drives variable speed means 118; and differential drive gear 114 drives end gear 122 of differential 124 which differential is used to sum the motion of end gears 122 and 126, i.e., the sum of the output of variable speed means 118 and a speed directly proportional to the speed of spindle 12.

Figure 4:
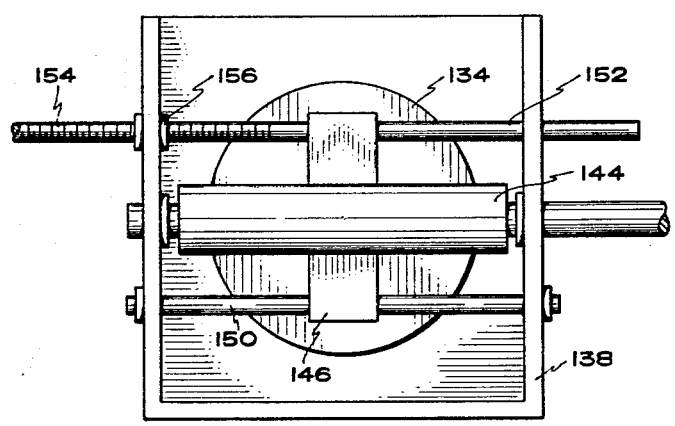
FIGURE 4 is a side view of the ball disc integrator used in the gear box shown in FIGURE 3.
Figure 5:
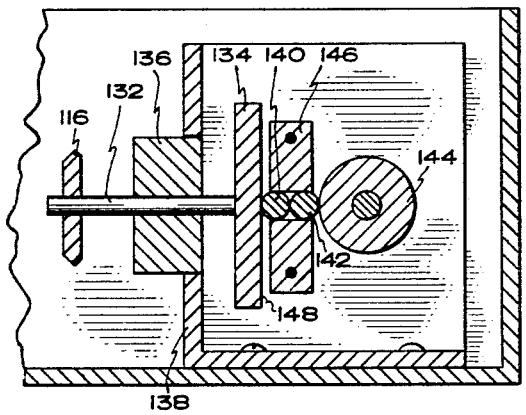
FIGURE 5 is a sectional view of FIGURE 3 taken along line 5—5 and showing in detail the coacting relationship of the driving components in the ball disc integrator.

Variable speed means 118 is a conventional variable speed device which is used to add or subtract a slight incremental speed to carriage 14. It is to be noted that while a ball disc type integrator is described herein and is the preferred variable speed device of my invention any other variable speed means can be used. Variable speed means 118, i.e., ball disc integrator, is shown in detail in FIGURES 3, 4 and 5. The integrator is driven with integrator drive shaft 132 which in turn is driven with beveled gear 116. Disc 134 is securely connected to drive shaft 132 so that said disc 134 rotates about its approximate center axis when said shaft 132 is rotated. Drive shaft 132 is journaled to bearing housing 136, which housing is in turn securely attached to integrator housing 138. When disc 134 rotates it coacts with ball 140 and, if said ball 140 is properly positioned on disc 134, said ball 140 is rotated. In turn ball 140 contacts ball 142 to thus rotate said ball 142. Said ball 142 is positioned to ride on drum 144 wherein rotation of said ball 142 is imparted to drum 144.

The rotation of drum 144 is transmitted to drive shaft 130, which shaft is securely connected to drum 144, which in turn rotates gear 128. Gear 128 coacts with differential end gear 126 to provide a second input to said differential as previously indicated. Drum 144 is journaled at its opposite ends to housing 138 along a plane which passes substantially along the axis of said drum and along the center line of disc 134. Balls 140 and 142 are maintained in housing 146, which housing is adapted to be moved in a direction which is parallel with the axis of drum 144 to propel ball 140 across surface 148 of disc 134, so that their centers fall on said center line of disc 134. So that housing 146 may move in the fashion herein described, it is slidably mounted at one end to slide rod 150. Said slide rod 150 is secured at its opposite ends to integrator housing 138 and positioned in a plane which is parallel with drum 144. Ball housing 146 is also secured to adjusting screw 152 which screw is attached and journaled to said housing 146. Screw 152 is provided with threaded end 154 which coacts with female screw adaptor 156 which is secured to integrator housing 138.

When disc 134 is rotated, such rotational movement is imparted to ball 140 if it is positioned away from the center of disc 134, i.e., when ball 140 is located in the exact center of disc 134 said ball 140 remains perfectly still. As housing 146 moves away from the center of said disc 134 the speed at which ball 140 rotates is increased. The direction of rotation of ball 140 may be reversed by moving housing 146 to an opposite side of face 148 of disc 134. In this fashion, the motion of integrator drive shaft 130 may be completely controlled by merely adjusting screw 152. While the same effect could be obtained by using only ball 140 instead of balls 140 and 142, the additional ball is used to enable the integrator to be adjusted when disc 134 is not rotating, i.e., the additional ball enables rolling adjustment rather than sliding adjustment.

The output from integrator 118 and differential drive gear 114 are summed in differential 124. Said differential 124 generally comprises output drive shaft 158 which is journaled at one end in bearing 160, secured to housing 138, and also in bearing 162, secured to housing 164.

Junction block 166 is fixedly attached to said drive shaft 158 and is in turn provided with spider cross arms 168 and 170 which arms are attached to opposite ends of said junction block 166. Spider beveled gears 172 and 174 are journaled to said spider cross arms 168 and 170 respectively and are positioned to coact with end beveled gears 176 and 178 which are in turn fixedly attached to differential end gears 122 and 126, i.e., end beveled gear 176 is attached to differential end gear 122 and end beveled gear 178 is attached to differential end gear 126, each of which are rotatably mounted on drive shaft 158. As seen from the description of differential 124 it is a conventional one such as the type used in automobiles and the like. Its function is to provide an output which is the sum of the input to end gears 122 and 126. While a differential of the type described is the preferred summing device of my invention, it should be noted that any planetary or epicyclic gearing means may be used which has compound drive inputs and a single output which sums the inputs.

In a circumferential winding operation, carriage 14 is only moved a small amount during each of its revolutions. This incremental movement is obtained from variable speed means 118 according to the fashion previously described. As shown in FIGURE 3, integrator output shaft 130 drives beveled gear 120 which in turn drives coacting beveled gear 180. Said gear 180 is fixedly attached to circumferential drive shaft 182 which shaft powers carriage 14 during circumferential winding operations. Accordingly, variable speed means 118 may be considered to be circumferential gear box 20 and a portion of helical gear box 24.

Figure 6:
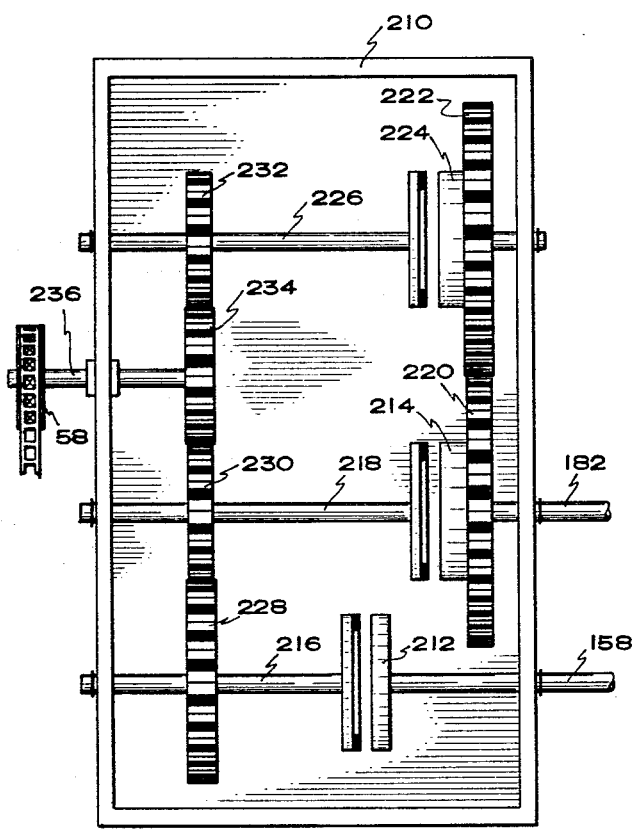
FIGURE 6 is a plan view of the preferred reversing gears and clutches used in my apparatus during helical and circumferential winding operations.

FIGURE 6 shows one preferred device for reversing the direction of travel of carriage 14 and the clutches used in circumferential and helical winding operations. The reversing gears with associated clutches are enclosed in housing 210. Circumferential drive shaft 182 and helical drive shaft 158 are journaled within said housing 210 and are provided with clutches 214 and 212 respectively, which clutches are used to engage and disengage drive shaft 218 and drive shaft 216. Shaft 182 also drives gear 220 which in turn coacts with gear 222 to drive said gear and connected clutch 224. Clutch 224 in turn drives reversing shaft 226. Gears 228, 230 and 232 are attached to shaft 216, 218 and 226 respectively. Gear 228 coacts with gear 230 which in turn drives gear 234 to drive carriage drive shaft 236 with connected sprocket 58. Gear 232 also coacts with gear 234 to drive said shaft 236. As shown in FIGURE 6, each of the shafts supporting the various gears and clutches are journaled within housing 210 so that they may freely rotate.

To drive carriage 14 in a helical winding fashion, clutches 214 and 224 are disengaged and clutch 212 is engaged. Drive shaft 216 then rotates to turn drive gears 228, 230 and 234 which in turn rotates carriage drive shaft 236. In a circumferential winding operation, said clutch 212 is disengaged and either clutch 214 or clutch 224 is engaged. If said clutch 214 is engaged, shaft 218 is rotated to thereby rotate gears 230 and coacting gear 234 which activates sprocket 58 to drive carriage 14. When said carriage 14 has moved to one end of mandrel 38, clutch 214 is disengaged and clutch 224 is engaged. Gear 220 then coacts with gear 222 to drive shaft 226 which shaft in turn drives gear 232. Said gear 232 coacts with gear 234 to rotate shaft 236 in a direction which is reverse from the way said shaft 236 rotates when driven by gear 230. Accordingly, carriage 14 moves in an opposite direction across the face of mandrel 38 to thereby allow a second layer of filament to be wound upon said mandrel. Clutches 212, 214 and 224 may be any conventional clutching devices. However, I prefer to use conventional electromagnetic clutches which are activated by merely passing current through one portion of said clutch in a fashion which is well known in the art.

Figure 7:
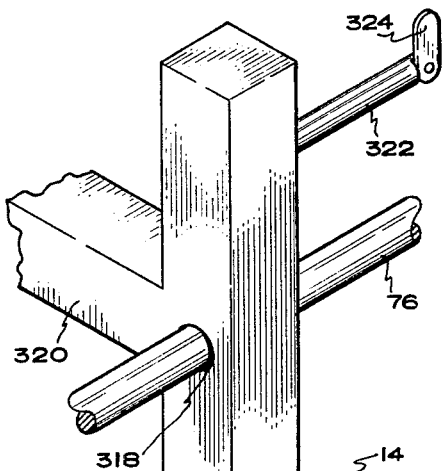
FIGURE 7 is an enlarged perspective view of the carriage shown in FIGURE 2.

FIGURE 7 shows an enlarged perspective view of carriage 14 and slide adaptor 74. Said slide adaptor 74 is provided with outwardly extending arms 310 and 312 which are spaced apart from each other to form a keyway thereby adapted to receive elongated slide arm 314 of carriage 14. Said slide adaptor 74 is accordingly designed to slide longitudinally along slide arm 314 and is also adapted to retain said arm 314 therein and prevent it from moving laterally when adaptor 74 is not moving. Carriage 14 is maintained in a substantially parallel plane with respect to spindle 12. To accomplish this, slide bar 76 passes through port 318 provided in elongated slide arm 314 thereby enabling said arm to slide along rod 76 as it is propelled by aligning adaptor 74. The ends of rod 76 are fixedly attached to end plate 32 so as to maintain said rod 76 in the desired position, i.e., in a plane which is substantially parallel with spindle 12. Carriage 14 is also provided with outwardly extending positioning arm 320 which is secured at one end to slide arm 314 and which is provided with aligning tip 82 at its other end for passing filament therethrough onto mandrel 38. Spool 78 of filament is placed upon spool supporting rod 322 which rod is securely affixed to slide arm 314 proximate its top end. Locking element 324 is secured to the end of said spool supporting rod 322 to retain said spool 78 upon said rod 322 while the apparatus of my invention is in use.

Slide adaptor 74 is provided with rotatably mounted connecting bolt 326 which is connected to chain 68 in such a fashion so that said chain 68 may freely move about sprockets 66 and 70. By using a construction of this type chain 68 moves around sprockets 68 and 70, with slide adaptor 74 connected thereto, while elongated slide arm 314 only reciprocates back and forth across the face of mandrel 38 without rotating. During this movement slide adaptor 74 slides back and forth over elongated slide arm 314. In this fashion carriage 14 moves across mandrel 38 until said carriage reaches a point at which chain 68 begins to move in an opposite direction and, at this time, carriage 14, of course, follows said chain.

It is to be noted that my invention is described herein in only its simplest terms. It is, of course, to be understood that various means may be used to reduce or increase the speed of the various components of my device, e.g., through the use of conventional reduction gears, pulleys, etc. For example, it is often desirable to reduce the speed of the input to differential end gear 122. Such modifications are considered to be obvious when considered by a person skilled in the art. As previously indicated, the output from the circumferential and helical drives may be imparted to any conventional programmer 28 other than the type described which sends impulses of various types to servomechanism which in turn powers carriage 14.

Whereas there is here illustrated and specifically described a certain preferred construction which is presently regarded as the best mode of carrying out the invention, it should be understood that various changes may be made and other construction adopted without departing from the inventive subject matter particularly pointed out and claimed.

I claim:

1. A filament winding device, for winding filament on a mandrel, having a spindle for rotating said mandrel; drive means for rotating said spindle; carriage means for positioning filament on said mandrel; and speed control means for controlling the speed of movement of said carriage as it positions filament on said mandrel which comprises variable speed means, driven by first drive means, for providing an output drive at a speed which is a predetermined incremental speed of the speed of said first drive means; variable speed output drive means, driven by said output drive of said variable speed means, for driving first input means; second drive means for driving second input means; compound drive summing means, driven by said first input means and said second input means, for summing the rotation of said first input means and said second input means in the movement of single output means; and carriage drive means, driven by said single output means, for driving said carriage.

2. The filament winding device of claim 1 wherein said compound drive summing means is a planetary gearing means.

3. The filament winding device of claim 1 wherein said planetary gearing means is a differential.

4. The filament winding device of claim 1 wherein said variable speed means is a ball disc integrator.

5. The filament winding device of claim 3 wherein said variable speed means is a ball disc integrator.

6. The filament winding device of claim 5 wherein said drive means for rotating said spindle also drives said variable speed means and said first input means.

7. The filament winding device of claim 1 wherein circumferential winding drive means, driven by said variable speed output drive means, are included in said speed control means for driving said carriage during a circumferential winding operation.

8. The filament winding device of claim 7 wherein clutching means are provided in said circumferential winding drive means and in said carriage drive means for engaging and disengaging each of said drive means to thereby selectively determine the type of movement imported to said carriage.

9. The filament winding device of claim 8 wherein reversing gear means are provided in said circumferential winding drive means to reverse the direction of movement of said carriage.

10. The filament winding device of claim 9 wherein said compound drive summing means is a planetary gearing means.

11. The filament winding device of claim 10 wherein said planetary gearing means is a differential.

12. The filament winding device of claim 9 wherein said variable speed means is a ball disc integrator.

13. The filament winding device of claim 11 wherein said variable speed means is a ball disc integrator.

14. The filament winding device of claim 13 wherein said drive means for rotating said spindle also drives said variable speed means and said first input means.

References Cited

UNITED STATES PATENTS

| | | | |
|---|---|---|---|
| 1,846,767 | 2/1932 | Steuer et al. | 242—158 X |
| 2,910,251 | 10/1959 | Prosen et al. | |
| 3,047,245 | 7/1962 | George | 242—158.5 X |
| 3,106,504 | 10/1963 | Carter | 242—158 X |
| 3,232,545 | 2/1966 | Ross et al. | 242—7 |
| 3,250,493 | 5/1966 | Burkley et al. | 242—158 |

FOREIGN PATENTS

| | | |
|---|---|---|
| 623,215 | 5/1949 | Great Britain. |

STANLEY N. GILREATH, *Primary Examiner.*